United States Patent [19]

Asaoka et al.

[11] Patent Number: 5,326,600
[45] Date of Patent: Jul. 5, 1994

[54] LIQUID CRYSTAL DEVICE

[75] Inventors: Masanobu Asaoka, Yokohama; Hideaki Takao, Sagamihara; Takeshi Togano, Yokohama; Makoto Kojima, Hino, all of Japan

[73] Assignee: Canon Kabushiki Kaisha, Tokyo, Japan

[21] Appl. No.: 969,970

[22] Filed: Nov. 2, 1992

[30] Foreign Application Priority Data

Nov. 8, 1991 [JP] Japan .................. 3-319634

[51] Int. Cl.$^5$ .......................... G02F 1/1337
[52] U.S. Cl. .................. 428/1; 428/473.5; 428/220; 359/75
[58] Field of Search .............. 428/1, 473.5, 220; 359/75, 77, 78

[56] References Cited

U.S. PATENT DOCUMENTS

| 4,367,924 | 1/1983 | Clark et al. ............ 350/334 |
| 4,561,726 | 12/1985 | Goodby et al. ......... 350/341 |
| 4,793,692 | 12/1988 | Kamio et al. .......... 350/311 |
| 4,876,330 | 10/1989 | Higashi et al. ......... 528/353 |
| 5,129,727 | 7/1992 | Hanyu et al. ........... 359/75 |

FOREIGN PATENT DOCUMENTS

| 0409194 | 1/1991 | European Pat. Off. . |
| 0494452 | 7/1992 | European Pat. Off. . |
| 107216 | 8/1981 | Japan . |
| 256323 | 11/1986 | Japan .................. 359/75 |
| 121416 | 5/1991 | Japan . |
| 287231 | 12/1991 | Japan . |
| 289621 | 12/1991 | Japan . |
| 62522 | 2/1992 | Japan . |

Primary Examiner—Alexander S. Thomas
Attorney, Agent, or Firm—Fitzpatrick, Cella, Harper & Scinto

[57] ABSTRACT

A liquid crystal device is constituted by a pair of substrates and a ferroelectric liquid crystal disposed between the substrates. At least one of the pair of substrates has thereon an alignment film of a polyimide having a recurring unit of the following formula (I):

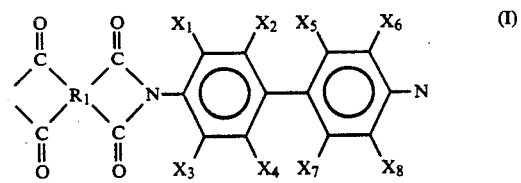

wherein $R_1$ denotes a tetravalent organic residue; and $X_1$–$X_8$ independently denote an alkyl group having 1–15 carbon atoms, an alkoxy group having 1–15 carbon atoms, $CF_3$ group, halogen or hydrogen atom with the proviso that at least one of $X_1$–$X_4$ is not hydrogen atom and at least one of $X_5$–$X_8$ is not hydrogen atom.

9 Claims, 6 Drawing Sheets

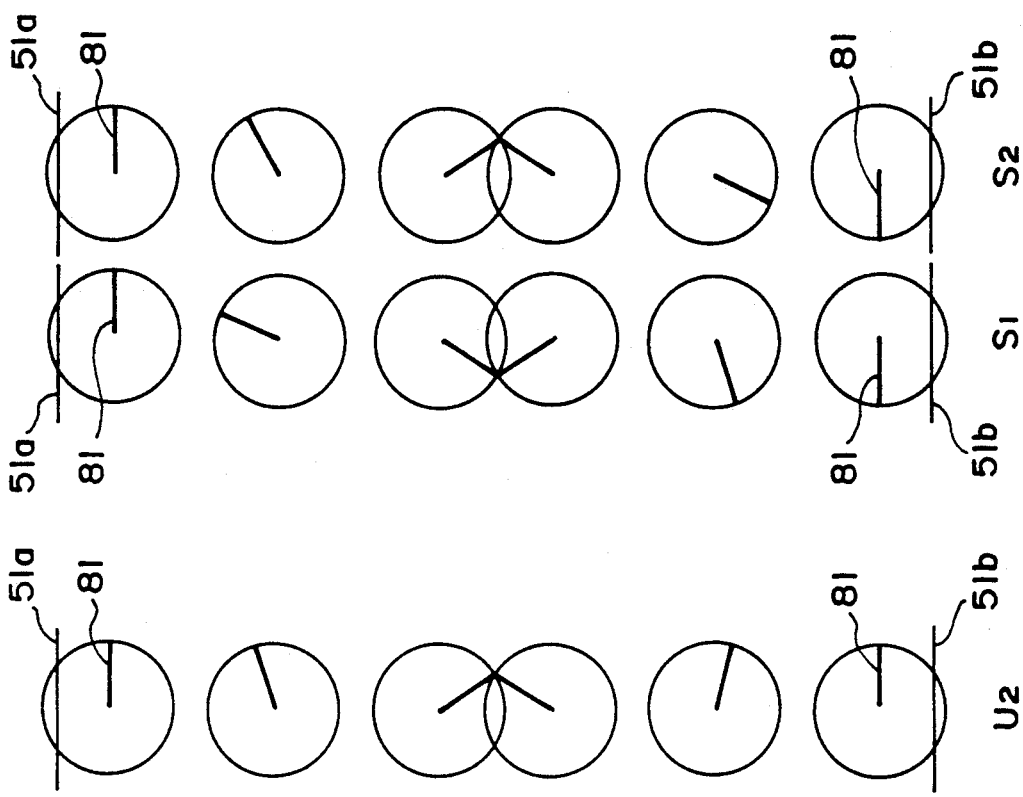
FIG. 6
FIG. 5
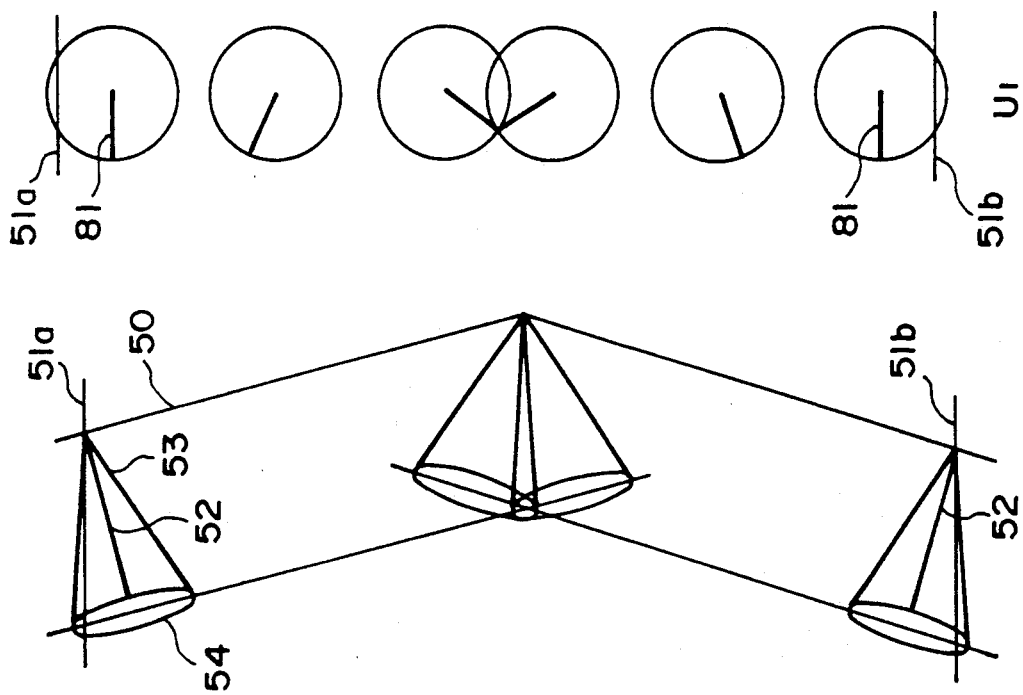
FIG. 4

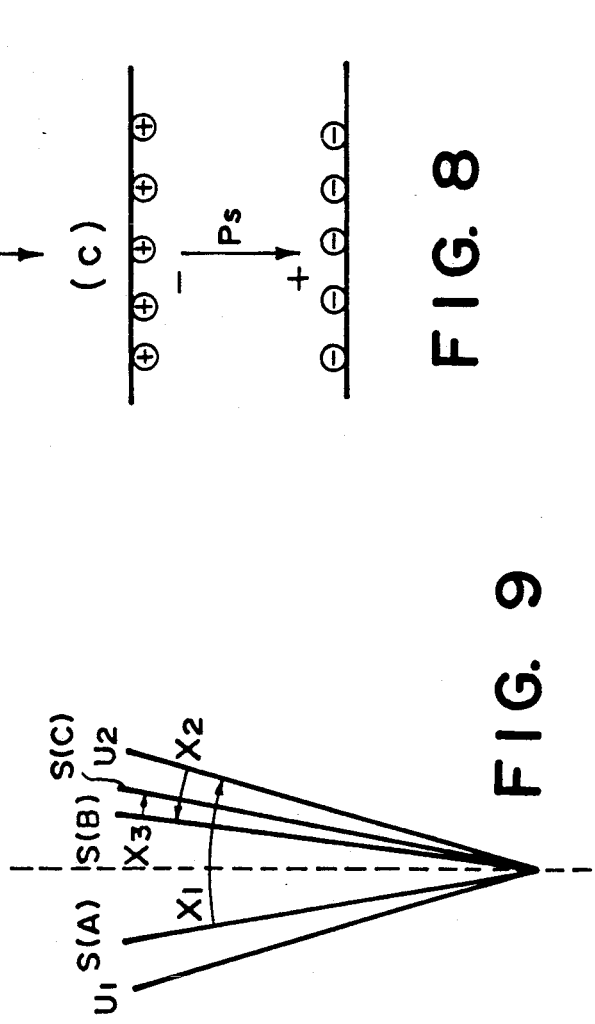
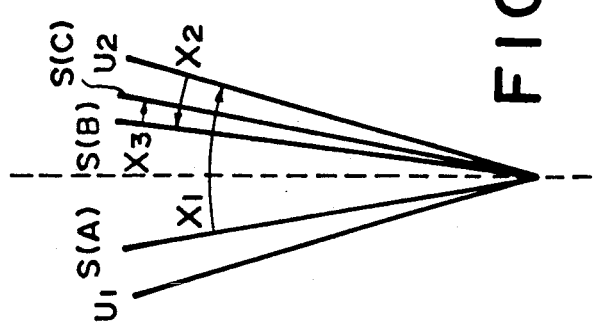
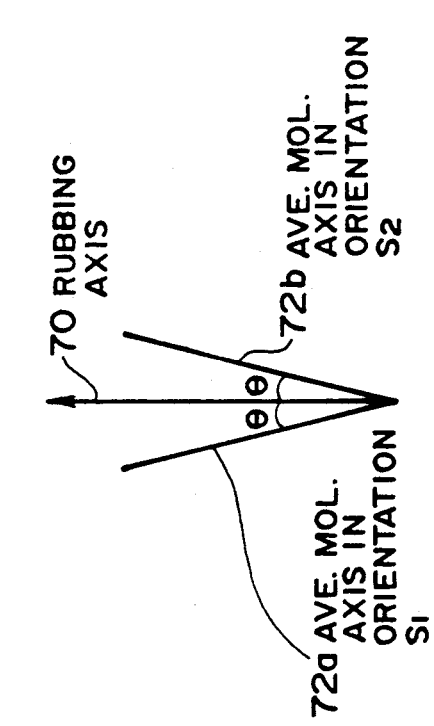
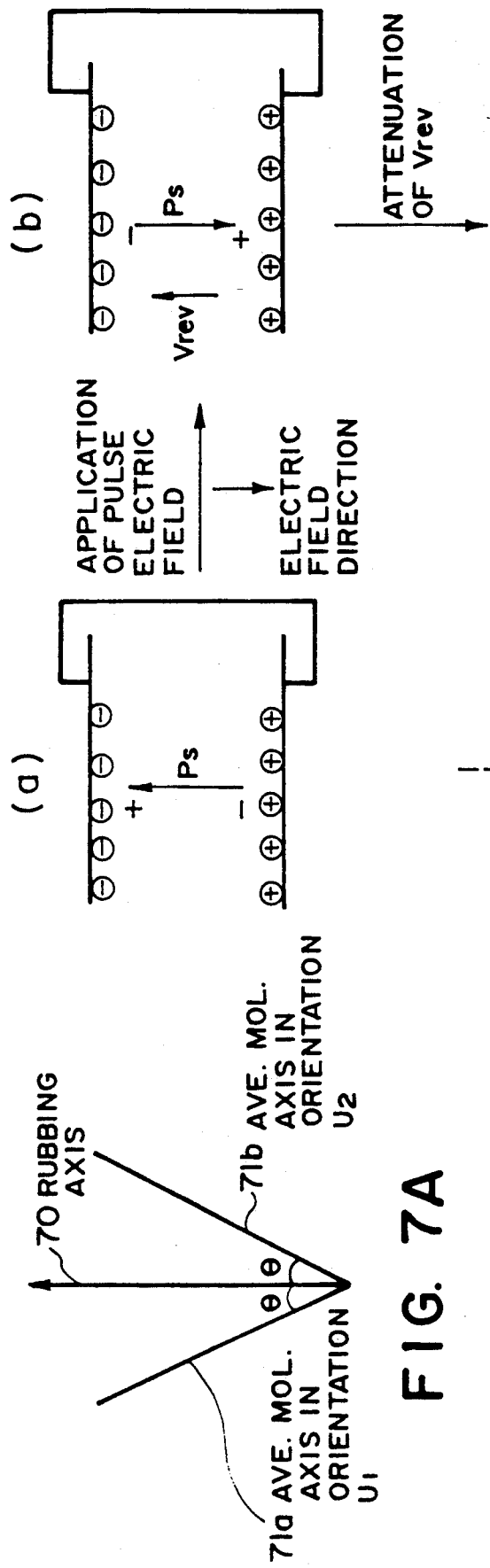

LIQUID CRYSTAL DEVICE

FIELD OF THE INVENTION AND RELATED ART

This invention relates to a liquid crystal device to be used in a liquid crystal display device or a liquid crystal-optical shutter, etc., particularly a liquid crystal device using a ferroelectric liquid crystal, more particularly to a liquid crystal device improved in display characteristics through improvement in initial alignment of the liquid crystal molecules.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107216/1981, U.S. Pat. No. 4,367,924). The ferroelectric liquid crystal has generally chiral smectic C phase (SmC*) or H phase (SmH*) of a non-helical structure and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display in view of its excellent function.

For an optical modulating device using a ferroelectric liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I0 = \sin^2 4\theta \cdot \sin^2(\Delta nd/\lambda)\pi,$$

wherein $I_0$: incident light intensity,
$I$: transmitted light intensity,
$\theta$: tilt angle,
$\Delta n$: refractive index anisotropy,
$d$: thickness of the liquid crystal layer,
$\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle $\theta$ in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that a tile angle $\theta$ (an angle shown in FIG. 3 as described below) in a ferroelectric liquid crystal with a non-helical structure obtained by alignment with an alignment control film of the prior art has become smaller as compared with a tilt angle $\widehat{H}$ (the angle $\widehat{H}$ is a half of the apex angle of the cone shown in FIG. 2 as described below) in the ferroelectric liquid crystal having a helical structure. Particularly, the tilt angle $\theta$ in a ferroelectric liquid crystal with a non-helical structure obtained by alignment with alignment control films of the prior art was found to be generally on the order of 3-8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle $\widehat{H}$ in a helical structure. More specifically, it has been found that the tilt angle $\theta$ in a non-helical structure becomes smaller than the tilt angle $\theta$ because of a twist alignment of liquid crystal molecules in the non-helical structure. Thus, in a ferroelectric liquid crystal having a non-helical structure, liquid crystal molecules are aligned with a twist from a molecular axis adjacent to an upper substrate to a molecular axis adjacent to a lower substrate continuously at a certain twist angle. This leads to a phenomenon that the tilt angle $\theta$ in the non-helical structure is smaller than the tilt angle $\widehat{H}$ in the helical structure.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an after-image during display. The generation of the above-mentioned reverse electric field has been reported in "Switching characteristic of SSFLC" by Akio Yoshida, "Preprint for Liquid Crystal Forum, October 1987" p.p. 142-143.

SUMMARY OF THE INVENTION

Accordingly, an object of the present invention is to provide a ferroelectric liquid crystal device having solved the above-mentioned problems, particularly a ferroelectric liquid crystal device which provides a large tilt angle of a chiral smectic liquid crystal in a non-helical structure and provides a display capable of displaying a high-contrast image and yet free from after-image.

According to the present invention, there is provided a liquid crystal device, comprising: a pair of substrates and a ferroelectric liquid crystal disposed between the substrates; at least one of said pair of substrates having thereon an alignment film comprising a polyimide having a recurring unit of the following formula (I):

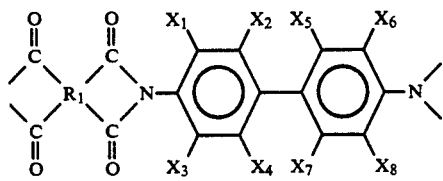

wherein $R_1$ denotes a tetravalent organic residue; and $X_1$-$X_8$ independently denote an alkyl group having 1-15 carbon atoms, an alkoxy group having 1-15 carbon atoms, $CF_3$ group, halogen or hydrogen atom with the proviso that at least one of $X_1$-$X_4$ is not hydrogen atom and at least one of $X_5$-$X_8$ is not hydrogen atom.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4 is a schematic sectional view showing an alignment state of a chiral smectic liquid crystal aligned according to the present invention.

FIG. 5 is an illustration of C-director alignments in a uniform alignment state.

FIG. 6 is an illustration of C-director alignments in a splay alignment state.

FIGS. 7A and 7B are plan views illustrating tilt angles $\theta$ in a uniform alignment state and a splay alignment state, respectively.

FIG. 8 is a sectional view showing a charge distribution, a direction of a spontaneous polarization $P_S$ and a direction of a reverse electric field $V_{rev}$.

FIG. 9 is a schematic plan view illustrating changes in tilt angle $\theta$ during and after application of an electric field.

DETAILED DESCRIPTION OF THE INVENTION

Figure 1:
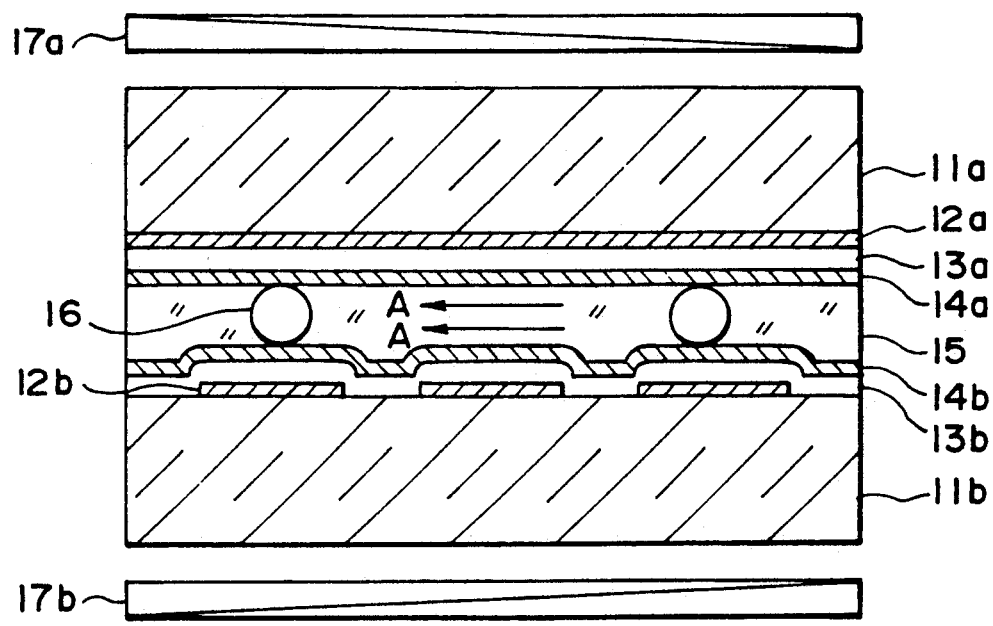
FIG. 1 is a schematic sectional view of an embodiment of the liquid crystal device according to the present invention.

FIG. 1 is a schematic sectional view of an embodiment of the liquid crystal device according to the present invention.

The liquid crystal device comprises a pair of substrates (glass plates) 11a and 11b which are coated with transparent electrodes 12a and 12b of $In_2O_3$, ITO (indium tin oxide), etc., 200-1000 Å-thick insulating films 13a and 13b of $SiO_2$, $TiO_2$, $Ta_2O_5$, etc., and 50-1000 Å-thick alignment control films 14a and 14b.

In this instance, the alignment control films 14a and 14b have been treated by rubbing, as a uniaxial aligning treatment, in directions which are parallel to each other and in the same direction (indicated by arrows A in FIG. 1). A chiral smectic liquid crystal 15 is disposed between the substrates 11a and 11b, and the spacing between the substrates 11a and 11b is set to provide the liquid crystal layer 15 with a thickness (e.g., 0.1-3 microns) which is sufficiently small to suppress the formation of a helical structure of the chiral smectic liquid crystal 15 by disposing spacer beads 16 of, e.g., silica, alumina, etc. between the substrates 11a and 11b, whereby the chiral smectic liquid crystal 15 assumes a bistable alignment state. The thus formed cell structure is sandwiched between a pair of polarizers 17a and 17b arranged in cross nicols.

According to our experiments, by using an alignment method using a specific polyimide alignment film treated by rubbing as explained with reference to Examples described hereinafter, there has been realized an alignment state which provides a large optical contrast between a bright and a dark state, particularly with respect to non-selected pixels during multiplexing drive as disclosed in U.S. Pat. No 4,655,561, etc., and also is free from a delay in optical response leading to a problem of after-image in a display at the time of switching during such multiplexing drive.

According to the present invention, at least one of the alignment films 14a and 14b is constituted by a polyimide having a recurring unit of the formula (I) below, which polyimide has been obtained by dehydrocyclization of a polyamide acid obtained by condensation of the corresponding tetracarboxylic dianhydride and diamine.

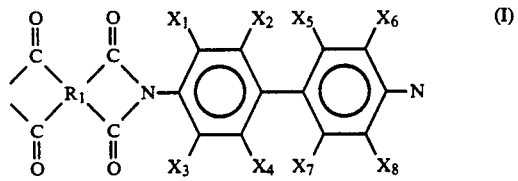

In the above formula (I), the tetravalent organic residue group $R_1$ is not particularly restricted but may preferably by an aromatic ring-containing group, examples of which may include:

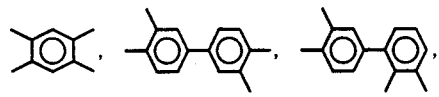

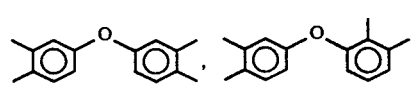

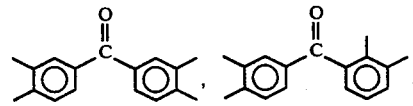

-continued

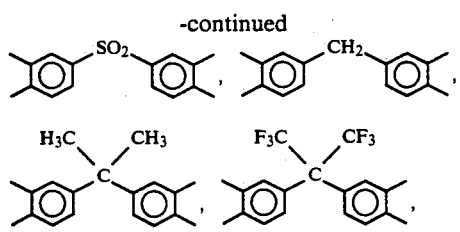

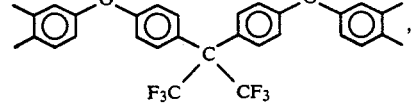

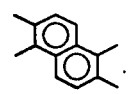

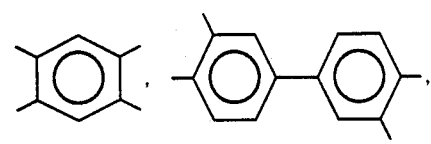

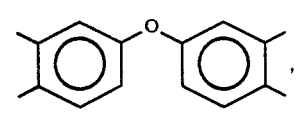

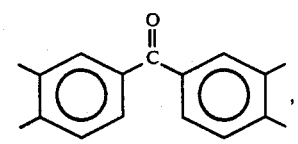

Among these tetravalent organic groups, the following may be particularly preferred:

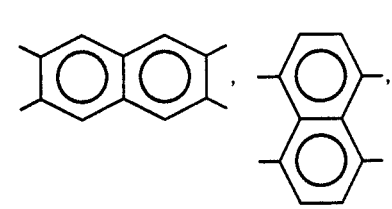

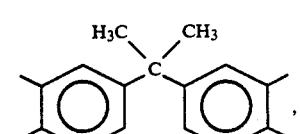

-continued

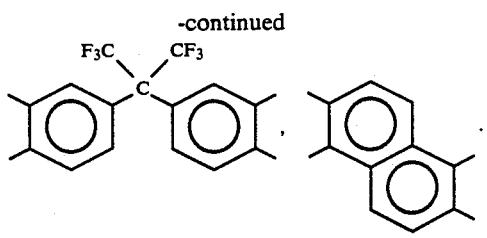

Further, when $X_1$-$X_8$ in the diamine component-constituting the recurring unit of the formula (I) are alkyl or alkoxy groups, they should have 1-15 carbon atoms, preferably 1-10 carbon atoms, more preferably 1-5 carbon atoms. When $X_1$-$X_8$ are halogen atoms, fluorine atoms are preferred.

The diamine component is not particularly restricted but preferred examples thereof may include those of the following formulae:

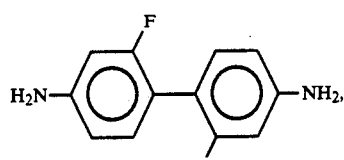

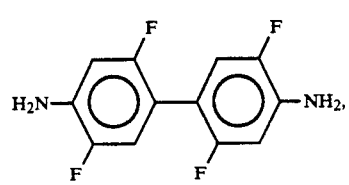

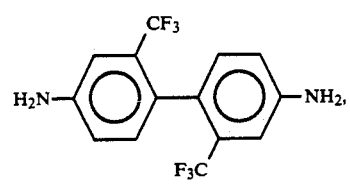

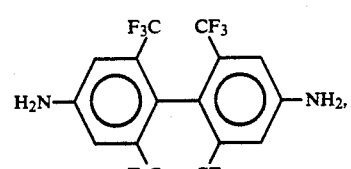

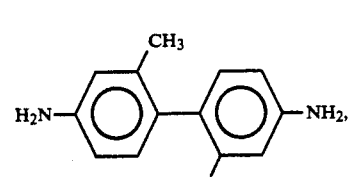

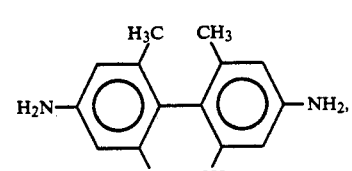

-continued
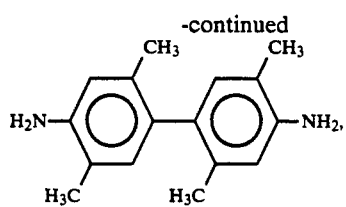
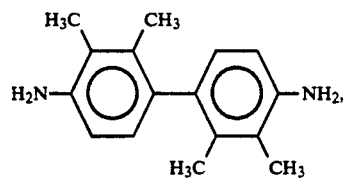
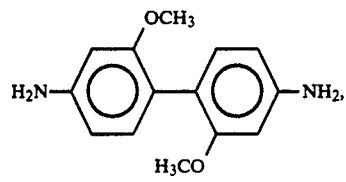
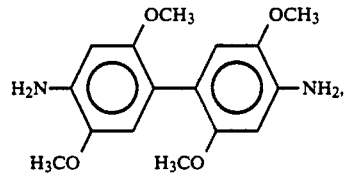
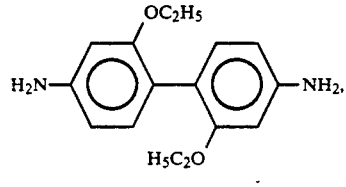
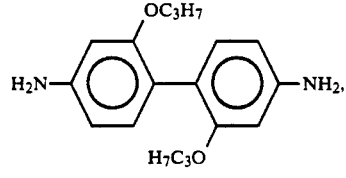
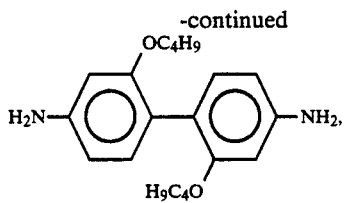
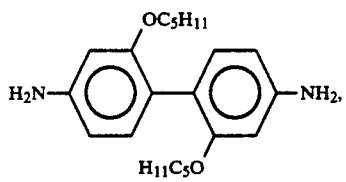
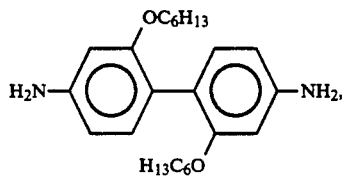
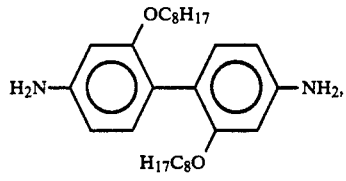
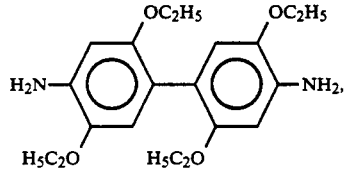
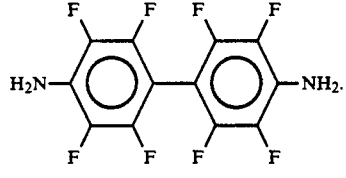
Hereinbelow, specific examples of the polyimide recurring unit represented by the general formula (I) will be enumerated:
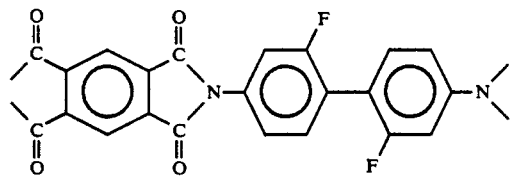
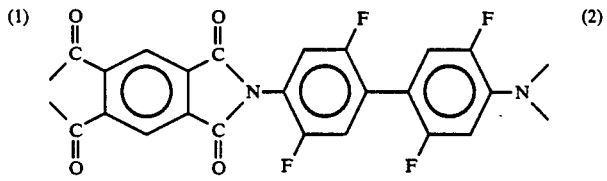
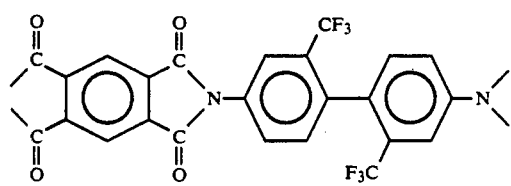
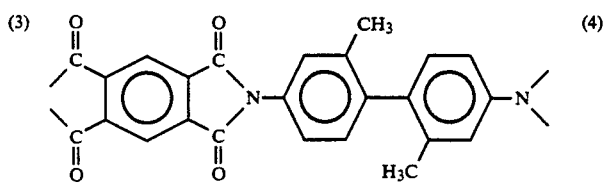

-continued
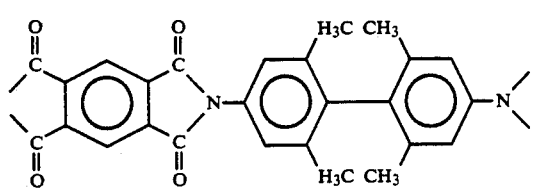 (5)
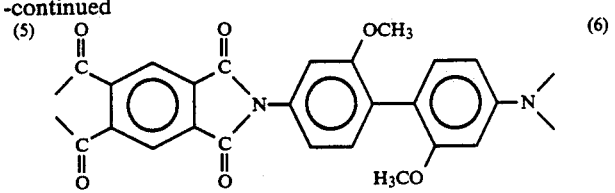 (6)
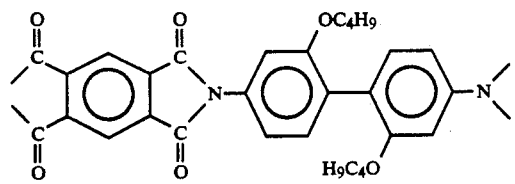 (7)
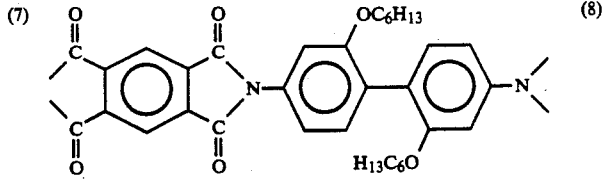 (8)
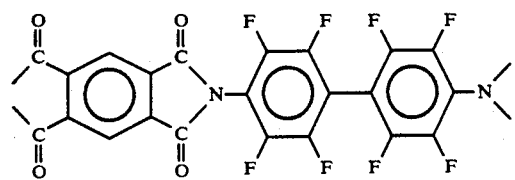 (9)
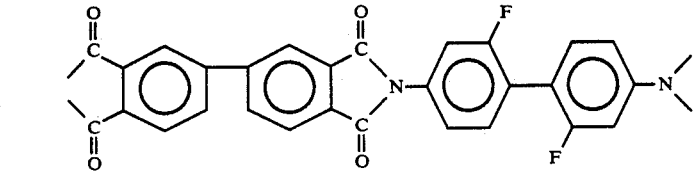 (10)
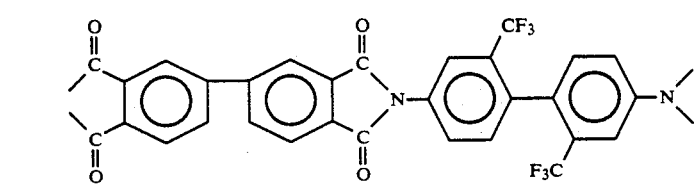 (11)
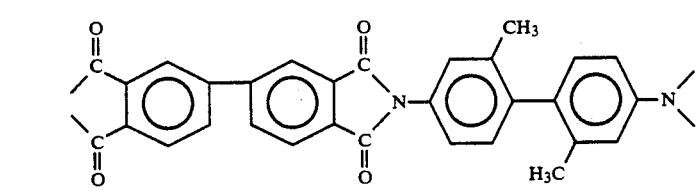 (12)
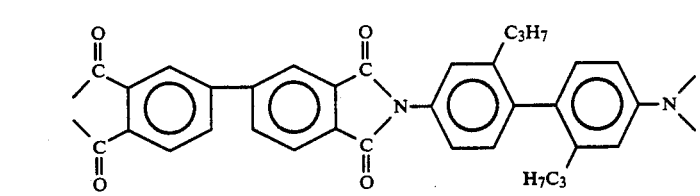 (13)
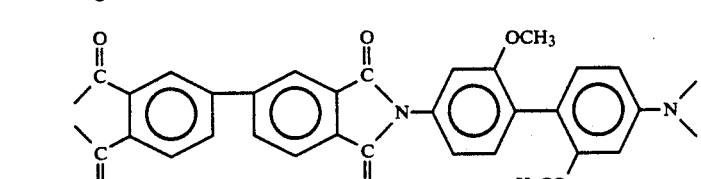 (14)
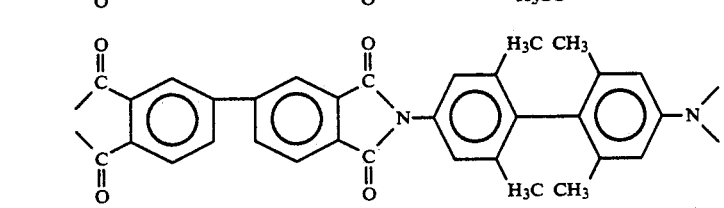 (15)

-continued
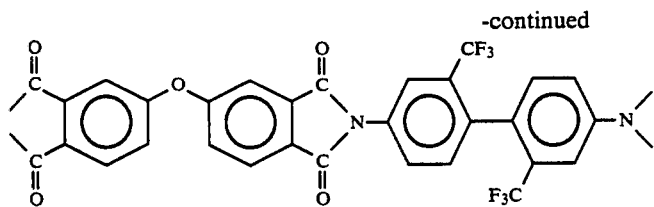
(16)
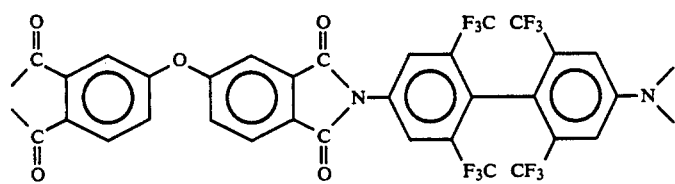
(17)
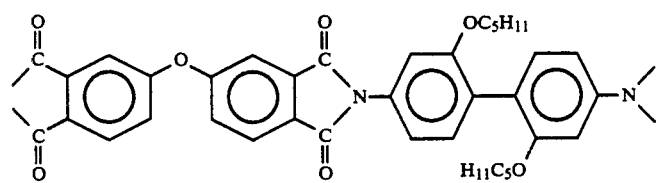
(18)
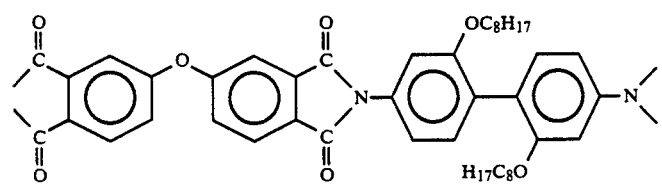
(19)
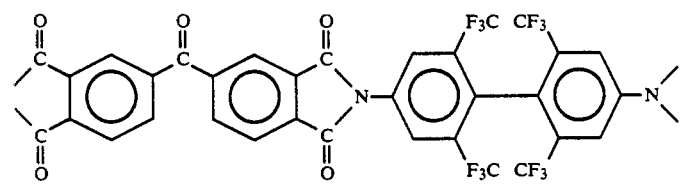
(20)
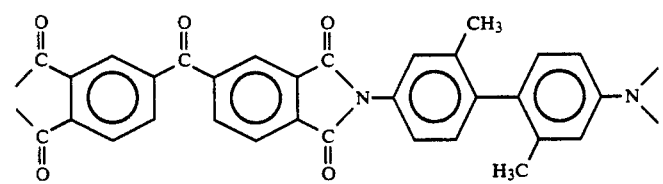
(21)
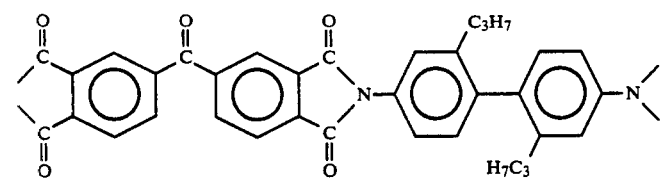
(22)
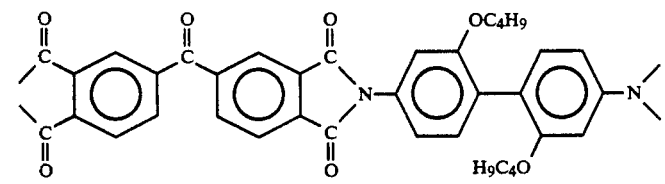
(23)
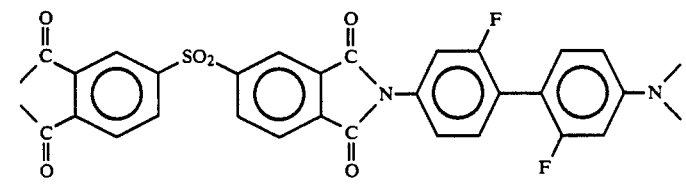
(24)

-continued
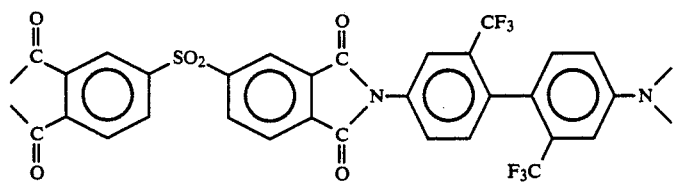
(25)
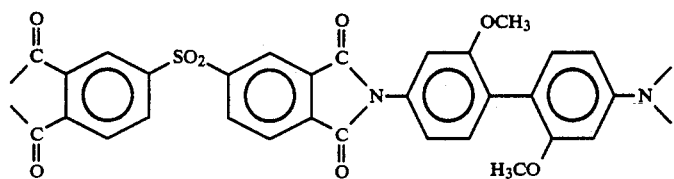
(26)
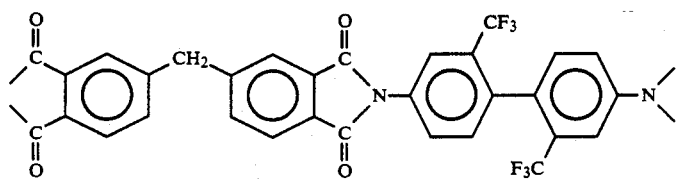
(27)
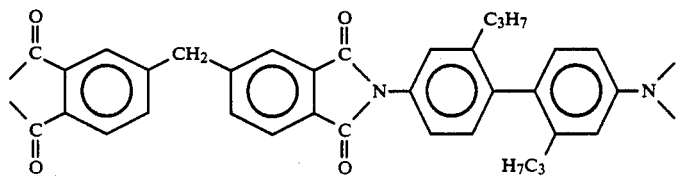
(28)
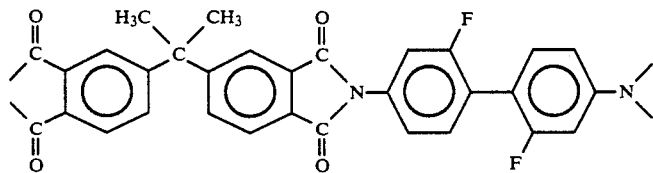
(29)
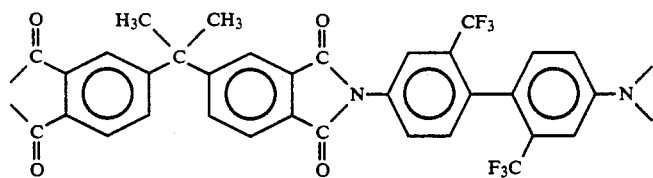
(30)
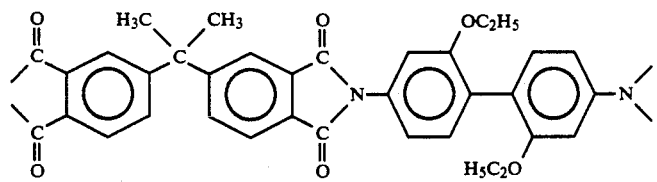
(31)
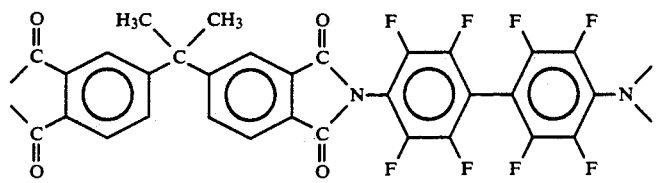
(32)

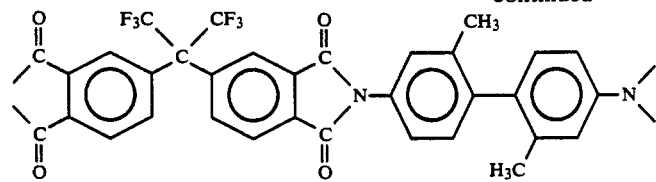
(33)
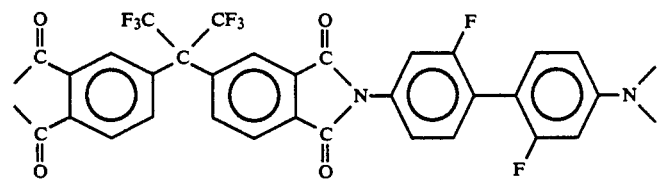
(34)
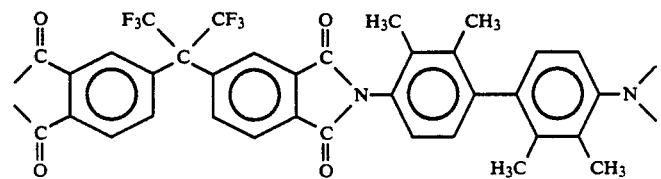
(35)
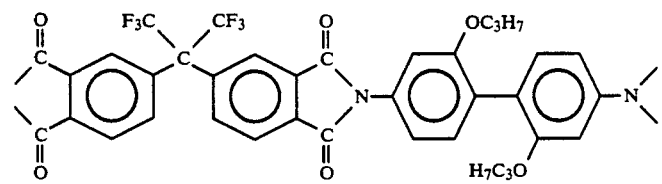
(36)
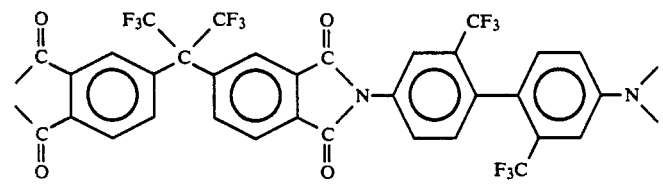
(37)
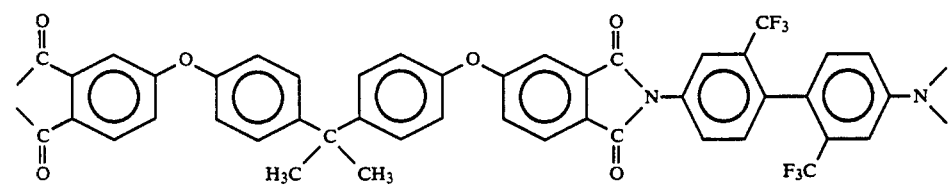
(38)
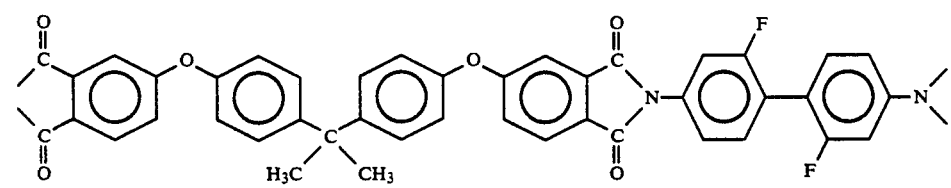
(39)
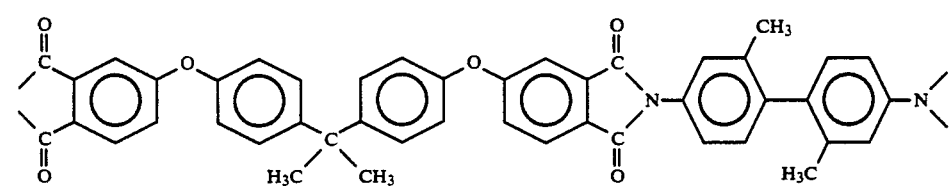
(40)
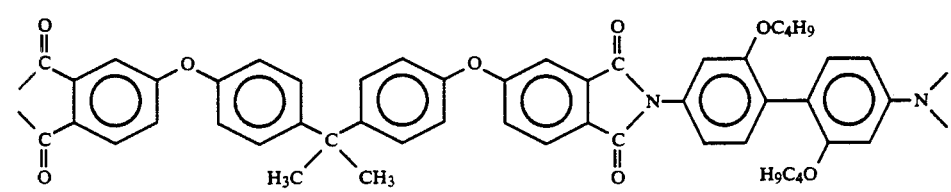
(41)

-continued
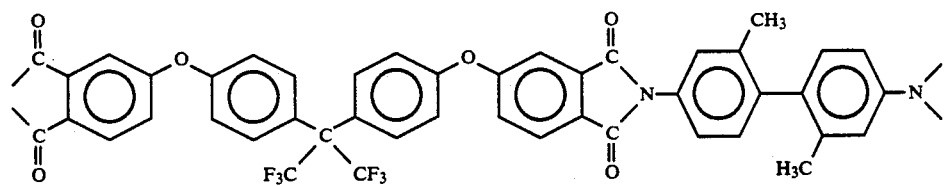
(42)
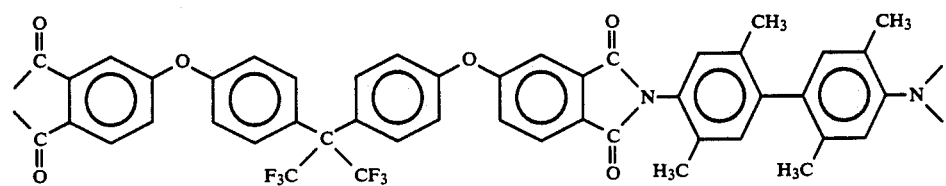
(43)
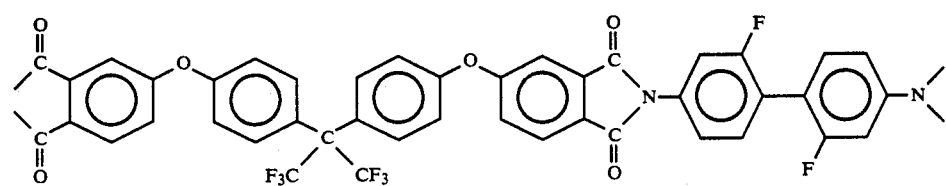
(44)
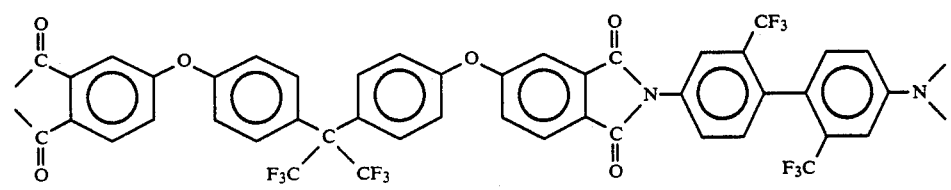
(45)
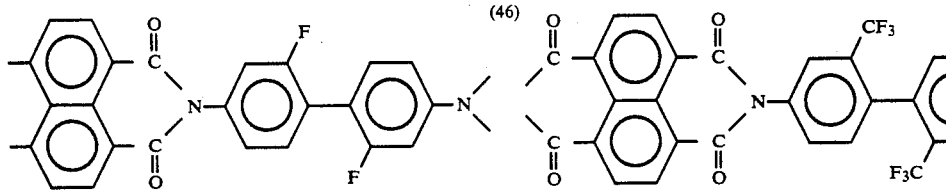
(46)
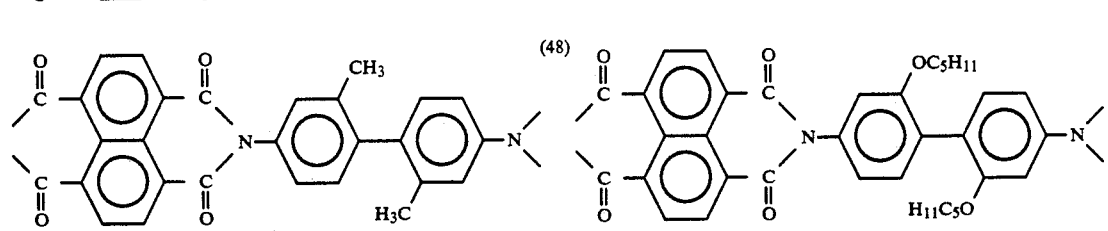
(47)
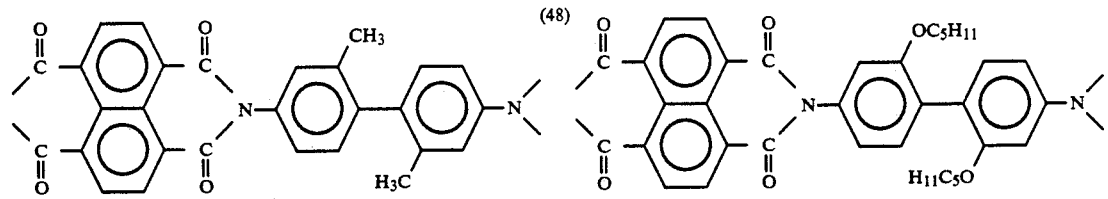
(48) (49)
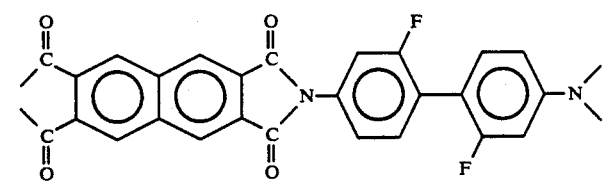
(50)
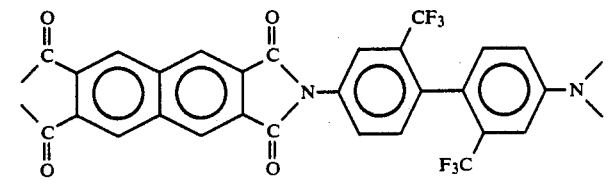
(51)

-continued

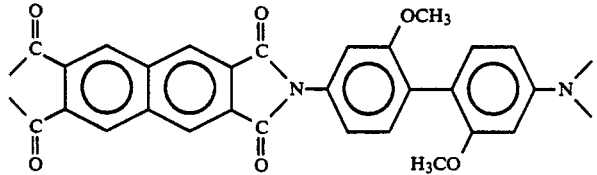
(52)

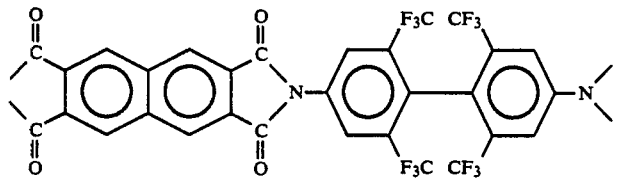
(53)

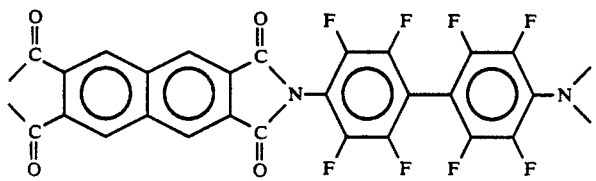
(54)

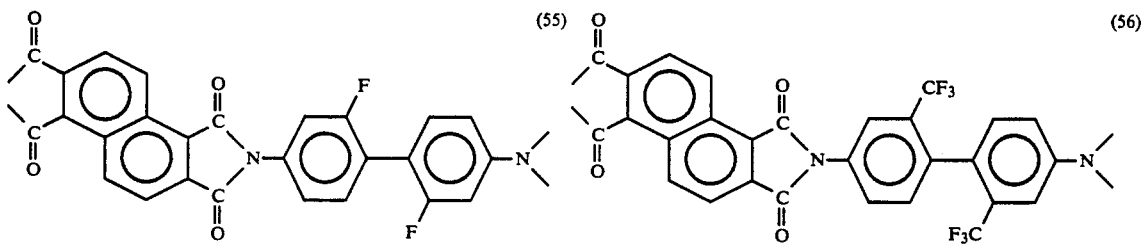
(55) (56)

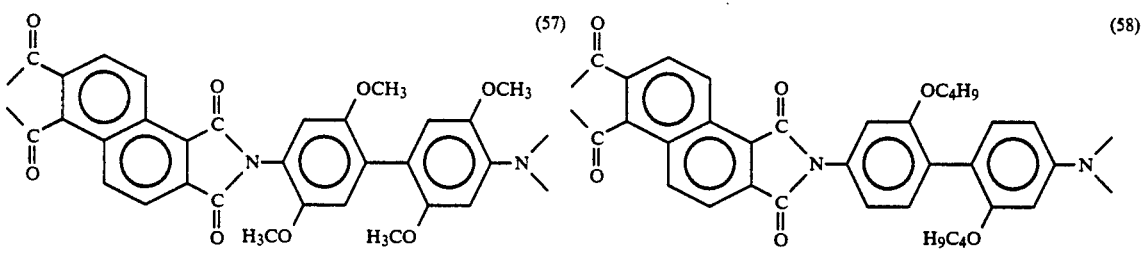
(57) (58)

The polyimide constituting the alignment film of the present invention may preferably include a recurring unit of, e.g., the above-mentioned formulae (1)-(58), so as to provide a number-average molecular weight of $10^4$-$10^5$, particularly $3\times 10^4$-$8\times 10^4$ as measured in its polyamide acid precursor form by GPC (gel permeation chromatography) corresponding to the molecular weights of standard polystyrene samples.

In order to form a film 14a or 14b of the polyimide on a substrate, a solution of a polyamide acid as a precursor of the polyimide prepared as described above in a solvent, such as dimethylformamide, dimethylacetoamide, dimethylsulfoxide or N-methylpyrrolidone at a concentration of 0.01-40 wt. % may be applied onto the substrate by spinner coating, spray coating, roller coating, etc., and heated at 100°-350° C., preferably 200°-300° C., to cause dehydro-cyclization. The thus-formed polyimide film may be rubbed with a cloth, etc.

The polyimide film may be formed in a thickness of, e.g., 30 Å-1 μm, preferably 200-2000 Å, so as to also function as an insulating film. In this case, the insulating films 13a and 13b can be omitted. Further, in case of forming the polyimide film on the insulating film 13a or 13b, the polyimide 100 Å or less.

The liquid crystal material 15 used in the present invention may preferably be one showing a phase transition from isotropic phase through cholesteric phase and smectic A phase into chiral smectic C phase in the course of temperature decrease. Particularly, a chiral smectic liquid crystal showing a helical pitch of 0.8 micron or longer in cholesteric phase (measured at a mid temperature in the cholesteric range). Preferred examples of such a liquid crystal material may include liquid crystal materials (1)-(5) below comprising the following liquid crystals [A], [B] and [C] in the indicated proportions by weight.

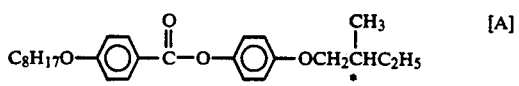
[A]

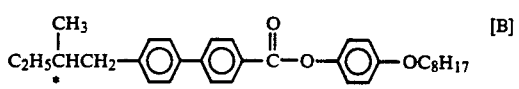
[B]

-continued

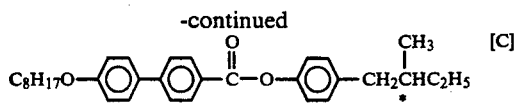

Liquid Crystal Material (1) [A]$_{90}$/[B]$_{10}$
(2) [A]$_{80}$/[B]$_{20}$
(3) [A]$_{70}$/[B]$_{30}$
(4) [A]$_{60}$/[B]$_{40}$
(5) [C]

Figure 2:
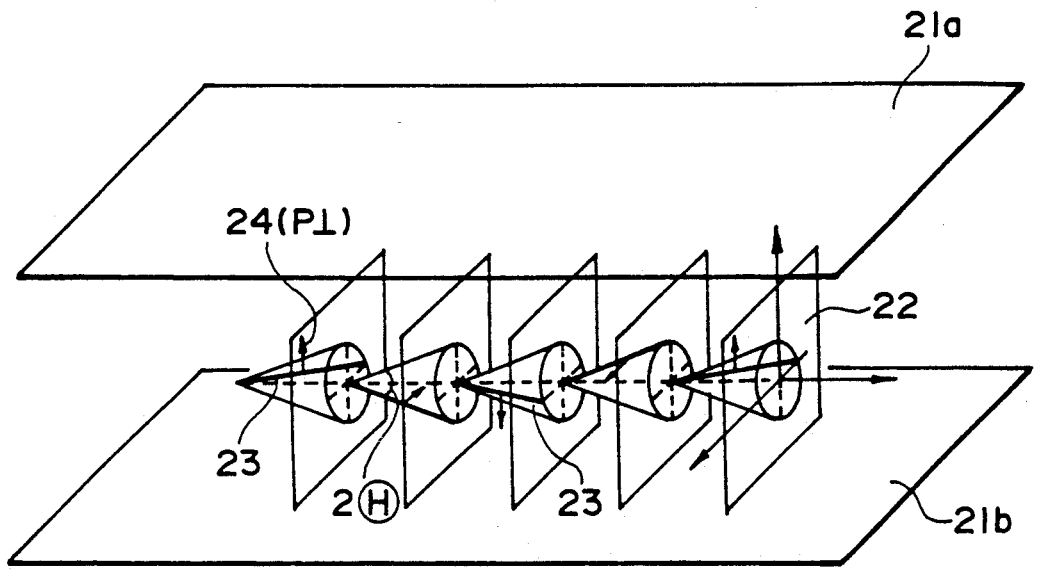
FIG. 2 is a perspective view showing schematically an alignment of a chiral smectic liquid crystal having a helical structure.

FIG. 2 is a schematic illustration of a ferroelectric liquid crystal cell (device) for explaining operation thereof. Reference numerals 21a and 21b denote substrates (glass plates) on which a transparent electrode of, e.g., In$_2$O$_3$, SnO$_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. A half of the apex angle of a helical cone in this state is a tilt angle (H) in chiral smectic phase of such a helical structure.

When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 ar all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
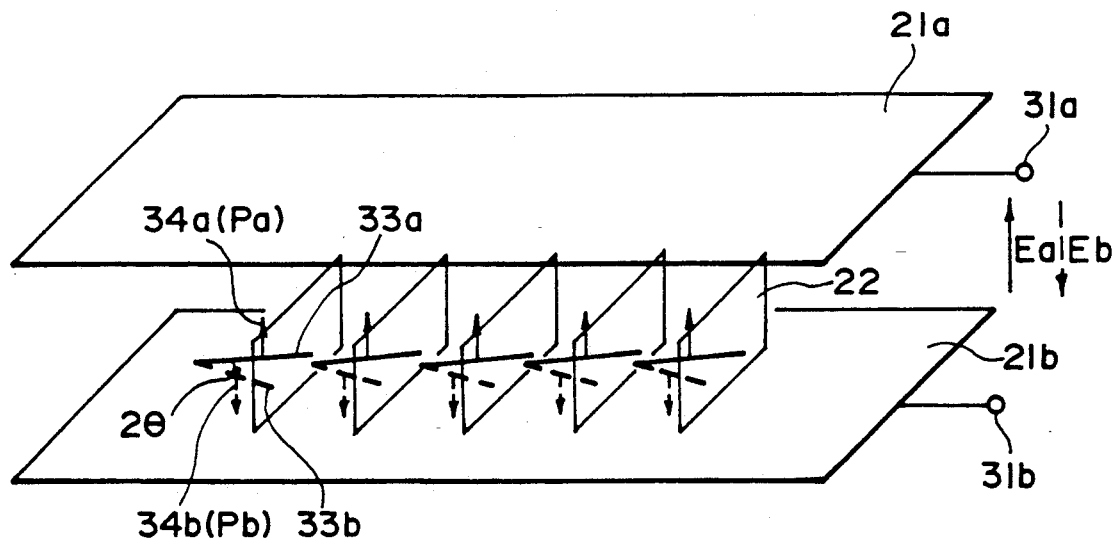
FIG. 3 is a perspective view showing schematically an alignment state of a chiral smectic liquid crystal having a non-helical structure.

Further, when the liquid crystal cell is made sufficiently thin (e.g., 0.1-3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics by voltage application means 31a and 31b, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

A first advantage attained by using such a ferroelectric liquid crystal cell is that the response speed is quite fast, and a second advantage is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

FIG. 4 is a schematic sectional view showing an alignment state of liquid crystal molecules attained by the present invention, and FIG. 5 is a view showing alignment of corresponding C-directors.

Reference numerals 51a and 51b in FIG. 4 denote upper and lower substrates, respectively. Numeral 50 denotes a molecular layer composed of liquid crystal molecules 52, and liquid crystal molecules 52 are aligned so as to change their positions along the bottom face 54 (circular) of a cone 54. FIG. 5 more specifically shows a change in C-directors. Referring to FIG. 5, at U$_1$ are shown C-directors 81 (each being a projection of a molecular long axis onto an imaginary plane perpendicular to the normal to a molecular layer 50) in one stable orientation state, and at U$_2$ are shown C-directors 81 in the other stable orientation state.

On the other hand, an alignment state attained by a conventional rubbing-treated polyimide film may be represented by a C-director diagram of FIG. 6, which shows an alignment state wherein molecular axes are twisted in a large degree from the upper substrate 51a to the lower substrate 51b to provide a smaller tilt angle θ.

FIG. 7A is a schematic plan view illustrating a tilt angle θ in an alignment state where C-directors 81 assume a state shown in FIG. 5 (referred to as "uniform alignment state"), and FIG. 7B is a schematic plan view illustrating a tilt angle θ in an alignment state where C-directors 81 assume a state shown in FIG. 6 (referred to as "splay alignment state"). In these figures, reference numeral 70 denotes a rubbing axis provided to the above-mentioned fluorine-containing polyimide film, numeral 71a denotes an average molecular axis in the orientation state U$_1$, numeral 71b denotes an average molecular axis in the orientation state U$_2$, numeral 72a denotes an average molecular axis in the orientation state S$_1$, and numeral 72b denotes an average molecular axis in the orientation state S$_2$. the average molecular axes 71a and 71b can be switched to each other by applying voltages of mutually opposite polarities. Similar switching is caused between the average molecular axes 72a and 72b.

Next, the effectiveness of the uniform alignment state with respect to a delay in optical response (after-image) due to a reverse electric field Vrev is explained.

If the capacitance of an insulating layer constituting a liquid crystal cell is denoted by Ci, the capacitance of a liquid crystal layer is denoted by C$_{LC}$ and the spontaneous polarization of the liquid crystal is denoted by P$_S$, Vrev causing after-image is expressed by the following equation.

$$Vrev = 2P_S/(Ci + C_{LC})$$

FIG. 8 is a schematic sectional view illustrating changes in charge distribution direction of $P_S$ and direction of the reverse electric field in a liquid crystal cell. At FIG. 8(a), there is shown a distribution of ⊕ and ⊖ charges in a memory state before application of a pulse electric field, where the spontaneous polarization is directed from ⊕ charges to ⊖ charges. At FIG. 8(b) is shown a state immediately after removal of a pulse electric field, when the direction of the spontaneous polarization $P_S$ is opposite to that shown at FIG. 8(a) (thus, the liquid crystal molecules are inverted from one stable orientation state to the other orientation state) but the distribution of the ⊕ and ⊖ charges is similar to that shown at FIG. 8(a), so that a reverse electric field Vrev is generated as indicated by a arrow shown at FIG. 8(b). The reverse electric field Vrev disappears in a short time to provide a distribution of ⊕ and ⊖ charges as shown at FIG. 8(c).

Figure 10:
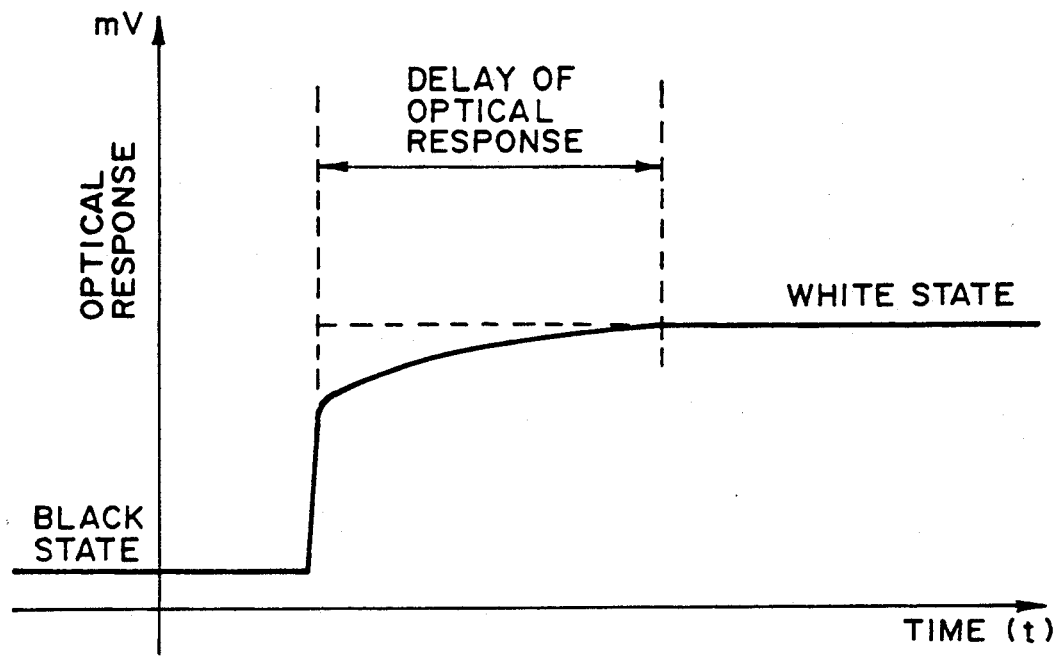
FIGS. 10 and 11 are graphs showing optical response characteristics according to a conventional device and the present invention, respectively.

FIG. 9 is a plan view showing a change in optical response in a splay alignment state given by a conventional polyimide alignment film in terms of a change in tilt angle θ. Referring to FIG. 9, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle Ⓗ along a path denoted by an arrow $X_1$, and immediately after the removal of the pulse electric field, the orientation is changed along a path denoted by an arrow $X_2$ to an average molecular axis S(B) in a splay alignment state providing a decreased tilt angle θ due to the action of the reverse electric field Vrev shown at FIG. 8(b). Then, as the reverse electric field Vrev attenuates as shown at FIG. 8(c), the orientation is changed along a path denoted by an arrow $X_3$ to an average molecular axis S(C) in a splay alignment state providing a stable orientation state having a somewhat increased tilt angle θ. The resultant optical response in this case is shown in FIG. 10.

Figure 11:
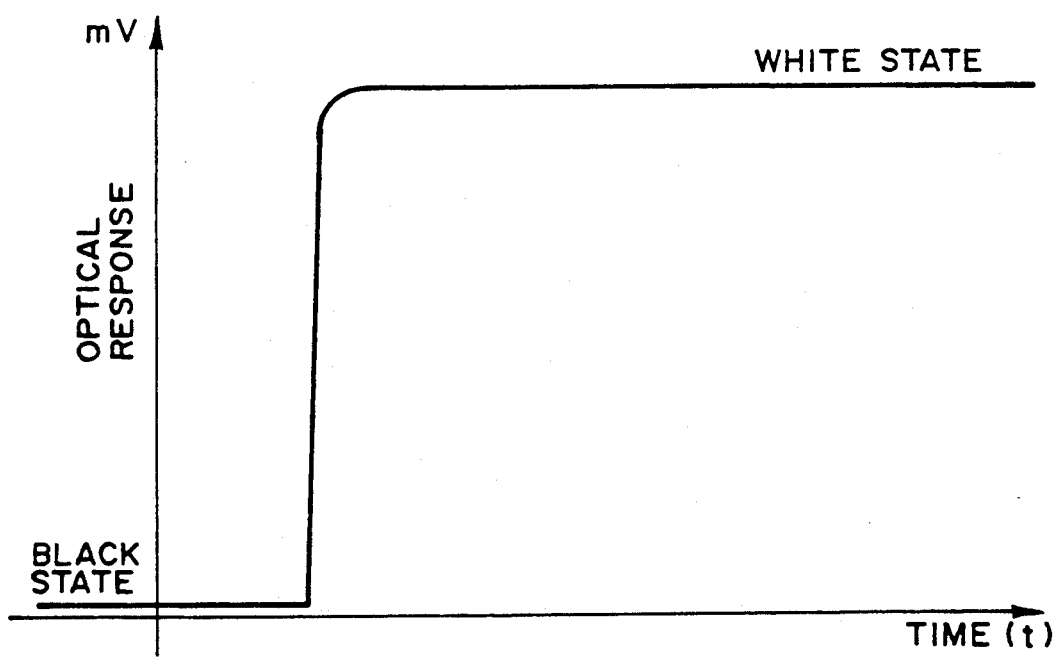

In the alignment state given by using the above-mentioned polyimide film of the specific structure of the present invention, the average molecular axes S(A), S(B) and S(C) in the splay alignment state shown in FIG. 9 are not caused but it is possible to form an alignment state with an average molecular axis giving a tilt angle 0 which is close to a maximum tilt angle Ⓗ. An optical response at this time according to the present invention is shown in FIG. 11. FIG. 11 shows that a delay in optical response causing after-image is obviated and a high contrast in memory states is caused.

More specifically, when the alignment film of the present invention is used, it is possible to provide the above-mentioned uniform alignment state. This is particularly true when the above-mentioned recurring unit of the formula (I) includes a fluorine atom in the group $R_1$ or a substituent $X_1-X_8$, which promotes the uniform alignment state to provide a liquid crystal device showing a high contrast.

Further, when the compounds of, e.g., the above formulae (4)–(8), (12), (15), (21), (35), (40), (42), (43) and (48) are used, it is preferred to apply an AC application treatment after the cell preparation. The AC voltage used for this purpose may comprise an amplitude of 5–100 volts, preferably 15–50 volts, and a frequency of 10–500 Hz, preferably 10–200 Hz. The AC application treatment may be performed for a period on the order of several seconds to 10 minutes.

As described above, by the ferroelectric liquid crystal device according to the present invention comprising a polyimide alignment film of the above-mentioned specific formula (I) as a layer on the transparent electrodes contacting the liquid crystal, it is possible to provide a high contrast between the bright and dark states, particularly a very large display contrast at the time of multiplexing drive, and also a high quality display free from ugly after-image.

Hereinbelow, the present invention will be explained based on Examples.

EXAMPLE 1

Two 1.1 mm-thick glass plates each provided with a 1000 Å-thick ITO film were respectively coated with a 3.0 wt. % solution of a polyamide acid represented by the formula (II) shown below (showing a number-average molecular weight (Mn) as measured by GPC of $6 \times 10^4$) in a mixture solvent of N-methylpyrrolidone/n-butylcellosolve = 2/1 by means of a spinner rotating at 3000 rpm.

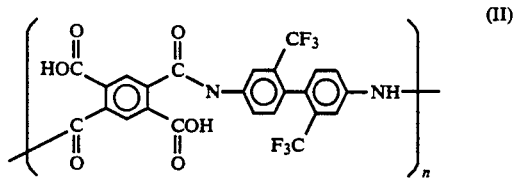

After the coating, the film was subjected to curing under heating at 250° C. for about an hour to form a 450 Å-thick film. The coating film was then rubbed in one direction with a nylon-planted cloth.

On one of the two glass plates thus treated, 1.5 microns alumina beads were dispersed, and the other glass plate was superposed thereon so that their rubbing axes were parallel to each other and disposed in the same direction to form a blank cell.

The blank cell was filled with a ferroelectric smectic liquid crystal ("CS-1014" (trade name), available from Chisso K.K.) under vacuum and, after sealing, was gradually cooled from isotropic phase at a rate of 0.5° C./hour to 30° C., whereby an alignment was effected. The "CS-1014" liquid crystal in the cell showed the following phase transition series.

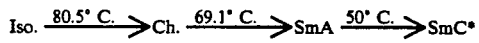

Iso.: isotropic phase,
Ch.: cholesteric phase,
SmA: smectic A phase.
SmC*: chiral smectic C phase.

The experiment thereafter was performed at 25° C.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle θ=14 degrees, transmittance in the brightest state=40%, transmittance in the darkest state=1.5%, contrast ratio=27:1.

The delay in optical response causing after-image was 0.2 sec or less.

Figure 12:
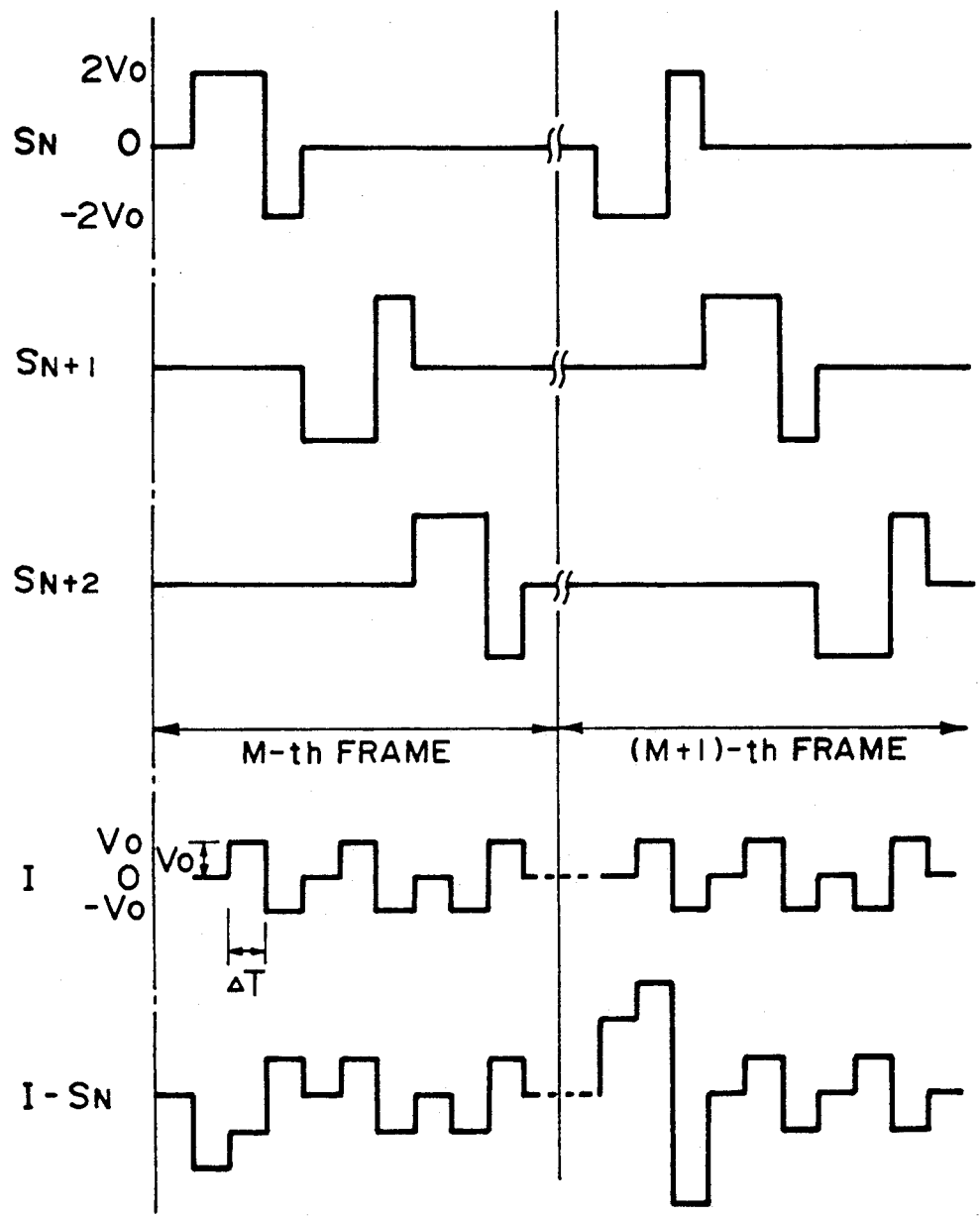
FIG. 12 is a waveform diagram illustrating driving waveforms used in an embodiment of the present invention.

The liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized. Referring to FIG. 12, at $S_N$, $S_{N+1}$ and $S_{N+2}$ are shown voltage waveforms applied to scanning lines, at I is shown a voltage waveform applied to a representative date line, and at $(I-S_N)$ is shown a combined voltage waveform applied to the data line I and the scanning line $S_N$. In the above embodiment, the drive was performed under the conditions of $V_0=5-8$ volts and $\Delta T=20-70$ μsec.

EXAMPLE 2

A liquid crystal cell was prepared in the same manner as in Example 1 except that the alignment control films were formed by a polyimide (Mn=$5\times 10^4$) represented by the recurring unit of the following formula (III):

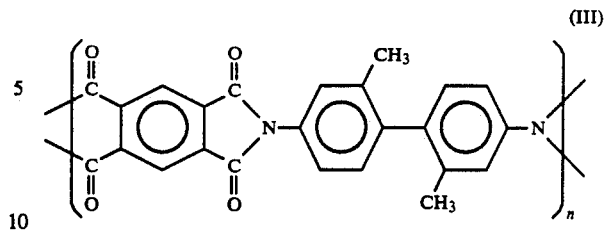

The resultant cell was supplied with an AC voltage of 20 volts and 50 Hz for 1 minute as a pretreatment, and then subjected to the measurement of contrast ratio and optical response in the same manner in Example 1, whereby the contrast was 24:1 and the delay time was 0.4 sec.

EXAMPLES 3-12

Liquid crystal cells were prepared in the same manner as in Example 1 except that the alignment control films (in terms of polyimide recurring units, Mn=$4\times 10^4 - 5\times 10^4$) and liquid crystal materials shown in Table 1 below were used.

The respective cells were tested in the same manner as in Example 1 (except that the cells of Examples 4 and 11 were subjected to the same AC voltage application pretreatment as in Example 2), whereby measured data of contrast ratio and delay time in optical response shown in Table 2 appearing hereinafter were obtained.

The respective cells were subjected to the multiplexing drive for display in the same manner as in Example 1, whereby similar results were attained with respect to contrast and after-image.

TABLE 1

| Ex. | Alignment control film | Liquid crystal material |
|---|---|---|
| 3 | (structure shown) | "CS-1014" (trade name) (FLC, Chisso) k.k.) |
| 4 | (structure shown) | Liquid crystal 3 mentioned-above |
| 5 | (structure shown) | Liquid crystal 3 mentioned-above |
| 6 | (structure shown) | "CS-1014" |

TABLE 1-continued

| Ex. | Alignment control film | Liquid crystal material |
|---|---|---|
| 7 | [structure: biphenyl dianhydride-derived diimide with 2,2'-di-propyl-4'-dimethylamino biphenyl] | "CS-1014" |
| 8 | [structure: benzophenone dianhydride-derived diimide with tetrakis(trifluoromethyl)biphenyl-dimethylamino] | " |
| 9 | [structure: 6FDA-derived diimide with 2,2'-bis(trifluoromethyl)-4'-dimethylamino biphenyl] | " |
| 10 | [structure: pyromellitic diimide with 2,2'-dibutoxy-4'-dimethylamino biphenyl] | Liquid crystal (3) |
| 11 | [structure: naphthalene diimide with 2,2'-dimethyl-4'-dimethylamino biphenyl] | Liquid crystal (3) |
| 12 | [structure: naphthalene diimide with octafluoro-dimethylamino biphenyl] | Liquid crystal (3) |

TABLE 2

| Example | Contrast ratio | Delay in optical response (sec) |
|---|---|---|
| 3 | 20:1 | 0.2 |
| 4 | 18:1 | 0.3 |
| 5 | 22:1 | 0.3 |
| 6 | 17:1 | 0.2 |
| 7 | 15:1 | 0.3 |
| 8 | 20:1 | 0.3 |
| 9 | 21:1 | 0.2 |
| 10 | 22:1 | 0.2 |
| 11 | 21:1 | 0.3 |
| 12 | 19:1 | 0.3 |

COMPARATIVE EXAMPLES 1-4

Liquid crystal cells were prepared in the same manner as in Example 1 except that the alignment control films (in terms of commercially available precursor polyamide acid varnish and liquid crystal materials shown in Table 3 below were used. The measured data of contrast ratio and delay in optical response measured for each of the cells are shown in Table 4 below.

The respective cells were subjected to the multiplexing drive for display in the same manner as in Example 1, whereby the resultant contrasts were smaller than that given by Example 1 and after-image was recognized for each cell.

TABLE 3

| Comparative Example | Alignment film (polyamide acid varnish) | Liquid crystal material |
|---|---|---|
| 1 | "SP-710" (trade name) (aromatic polyimide varnish, Toray K.K.) | "CS-1014" (trade name) (FLC, Chisso K.K.) |
| 2 | "SP-710" (trade name) (aromatic polyimide varnish, Toray K.K.) | Liquid crystal material (3) described hereinbefore |
| 3 | "LQ-5200" (trade name) | "CS-1014" |

TABLE 3-continued

| Comparative Example | Alignment film (polyamide acid varnish) | Liquid crystal material |
|---|---|---|
| 4 | (polyimide varnish, Hitachi Kasei K.K.) "LQ-5200" (trade name) (polyimide varnish, Hitachi Kasei K.K.) | Liquid crystal material (3) |

TABLE 4

| Comp. Example | Contrast ratio | Delay in optical response (sec) |
|---|---|---|
| 1 | 6:1 | 1.5 |
| 2 | 5:1 | 2.5 |
| 3 | 6:1 | 1.2 |
| 4 | 5:1 | 2.2 |

As described above, according to the liquid crystal device of the present invention, it is possible to provide a high-quality display which is characterized by a high contrast between the bright and dark states, particularly a very large contrast at the time of multiplexing drive and yet free from unpleasant after-image.

What is claimed is:

1. A liquid crystal device, comprising: a pair of substrates and a ferroelectric liquid crystal disposed between the substrates; at least one of said pair of substrates having thereon an alignment film comprising a polyimide having a recurring unit of the following formula (I):

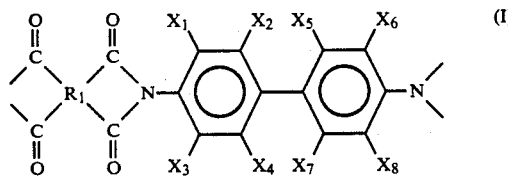

wherein $R_1$ denotes a tetravalent organic residue; and $X_1$-$X_8$ independently denote an alkyl group having 1-15 carbon atoms, an alkoxy group having 1-15 carbon atoms, $CF_3$ group, halogen or hydrogen atom, with the proviso that at least one of $X_1$-$X_4$ is not hydrogen atom, at least one of $X_5$-$X_8$ is not hydrogen atom, and at least one of $X_2$, $X_4$, $X_5$ and $X_7$ is not hydrogen atom.

2. A device according to claim 1, wherein $R_1$ in the formula (I) is selected from the group consisting of:

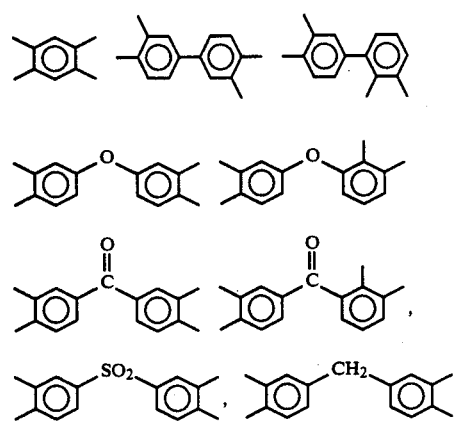

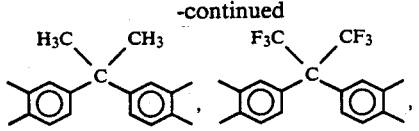

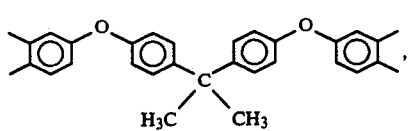

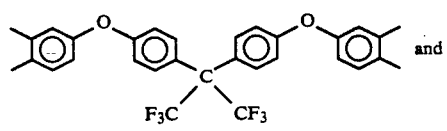

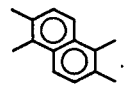

3. A device according to claim 1, wherein $R_1$ in the formula (I) is selected from the group consisting of:

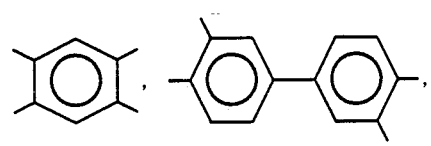

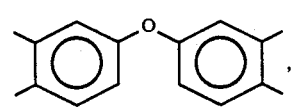

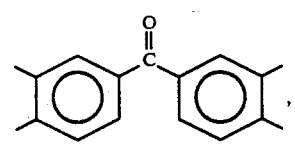

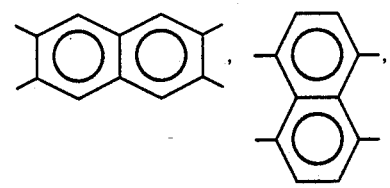

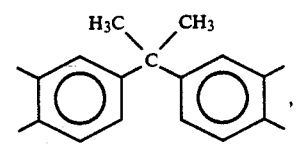

-continued

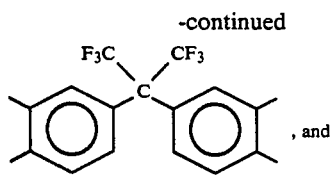, and

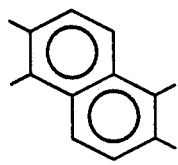

4. A device according to claim 1, wherein at least one of $X_1$-$X_8$ denotes an alkyl or alkoxy group having 1-10 carbon atoms.

5. A device according to claim 1, wherein at least one of $X_1$-$X_8$ denotes an alkyl or alkoxy group having 1-5 carbon atoms.

6. A device according to claim 1, wherein said ferroelectric liquid crystal assumes a uniform alignment state under the action of the alignment film.

7. A device according to claim 6, wherein said alignment film has been subjected to rubbing.

8. A device according to claim 1, wherein said alignment film has a thickness of 30 Å-1 µm.

9. A device according to claim 1, wherein said alignment film has a thickness of 200-2000 Å.

* * * * *

UNITED STATES PATENT AND TRADEMARK OFFICE
CERTIFICATE OF CORRECTION

PATENT NO. : 5,326,600
DATED : July 5, 1994
INVENTOR(S) : MASANOBU ASAOKA, ET AL.

It is certified that error appears in the above-identified patent and that said Letters Patent is hereby corrected as shown below:

COLUMN 2

Line 14, "tile angle θ" should read --tilt angle θ--.
Line 35, "angle θ" should read --angle --.

COLUMN 19

Line 67, "polyimide 100 Å" should read --polyimide film thickness may be set to 200 Å or less, preferably 100 Å--.

COLUMN 23

Line 15, "a" should read --an--.
Line 47, "angle 0" should read --angle θ--.

Signed and Sealed this

Tenth Day of January, 1995

Bruce Lehman

Attest:

BRUCE LEHMAN

Attesting Officer  Commissioner of Patents and Trademarks